Dec. 26, 1950 N. A. SMITH ET AL 2,535,703
LUBRICATING SYSTEM FOR GEAR UNITS
Filed Jan. 12, 1949

Inventors:
Norman A. Smith,
Francis O. Fridell,
by Lowell S. Mack
Their Attorney.

Patented Dec. 26, 1950

2,535,703

UNITED STATES PATENT OFFICE 2,535,703

LUBRICATING SYSTEM FOR GEAR UNITS

Norman A. Smith, Saugus, and Francis O. Fridell, Lynnfield Center, Mass., assignors to General Electric Company, a corporation of New York Application January 12, 1949, Serial No. 70,462

4 Claims. (Cl. 184—6)

This invention relates to systems for cooling and lubricating bearings and teeth of large gear units, particularly to an oil system for a reduction gear unit for marine propulsion.

In large capacity reduction gearing of the type described, it is convenient to use a single fluid for both lubricating and cooling the bearings and the meshing gear teeth. When starting and at low speeds, it is absolutely essential that the bearings receive an adequate supply of lubricant, particularly where the apparatus has been inactive for some time so that the oil in the bearings would have drained away or evaporated. At such low speeds, the cooling requirements of the bearings and gear teeth are of minor importance, while the lubrication function is of utmost importance. It is, of course, desirable that at all speeds the gear teeth receive some minimum supply of lubricant. On the other hand, as speed and load increases, it becomes increasingly necessary to flood the bearings and particularly the gear teeth with fluid lubricant for cooling purposes, and the requirements for bearing lubrication become a lesser portion of the total requirements. For the sake of low first cost, simplicity, and easy maintenance, it is, of course, desirable that a simple fluid supply system having only a single pump be provided for supplying fluid for both the cooling and lubricating functions for both gear teeth and bearings.

Accordingly, it is an object of the present invention to provide an improved oil supply system for apparatus of the type described which permits the use of a smaller, cheaper pump requiring less power for operation and less space, while adding a minimum of weight to the equipment.

Another object is to provide a lubrication system of the type described for effectively supplying the changing requirements of a reduction gear over a wide range of speeds by means of a single simple pump.

A further object is to provide a liquid distribution system of the type described requiring an oil reservoir of a minimum size.

Still another object is to provide a lubrication system for gearing in which the shearing friction losses in the oil film between the meshing gear teeth are reduced to a minimum, particularly at low speeds.

Figure 1:
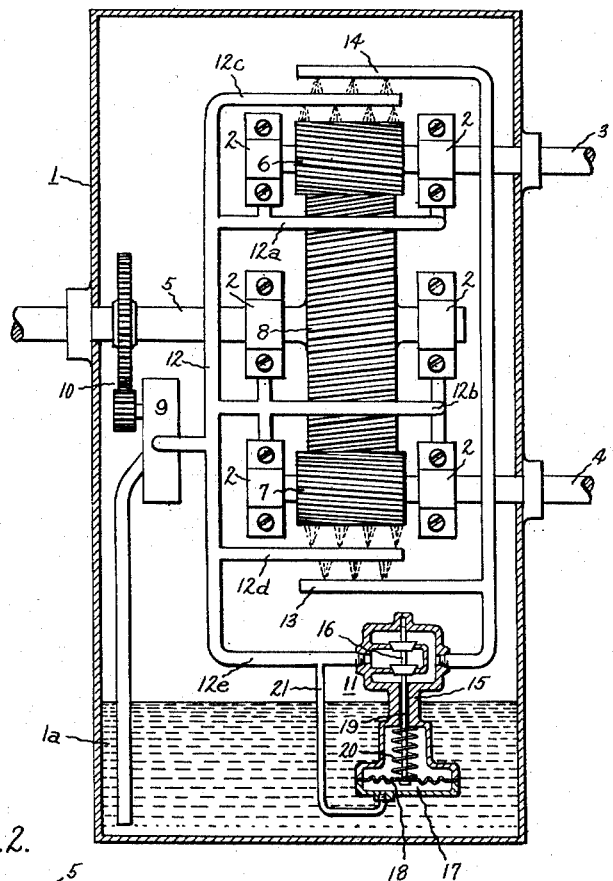
Figure 2:
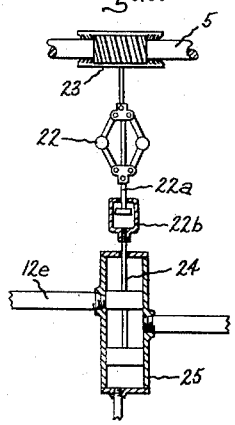

Other objects and advantages will be apparent from the following description taken in connection with the accompanying drawing in which Fig. 1 is a schematic view, partly in section, of an improved lubrication system for a large marine reduction gearing incorporating the invention; and Fig. 2 is a schematic view of an alternate form of the automatic control valve employed in the system.

Referring now more particularly to Fig. 1, the apparatus illustrated includes a suitable housing indicated generally at 1 having bearings of any suitable type supporting high speed pinion shafts 3, 4 and a "bull gear" shaft 5 carrying the pinions 6, 7 and the bull gear 8, respectively.

A suitable oil reservoir is provided for the system, and as shown in Fig. 1, this may conveniently be formed as an integral part 1a of the housing. For supplying cooling and lubricating fluid to the bearings and gear teeth, a pump 9 is supported in the housing and arranged to be driven by suitable gearing 10 from one of the rotating shafts. The mechanical details of the pump 9 are not material to an understanding of the present invention, since any suitable type of pump may be used. The well-known gear type of positive displacement pump is perhaps the cheapest and simplest, and is found quite adaptable to systems incorporating our invention. It will, of course, be appreciated by those skilled in the art that such a pump has a speed-pressure characteristic which is substantially a straight line, so that the discharge pressure of the pump may be readily used as a speed responsive signal. As will be seen hereinafter, with the pump arranged as shown in Fig. 1, a single pump serves both to provide the cooling and lubricating fluid and to supply a speed-responsive signal for actuating the automatic valve indicated generally at 11.

Lubricant for the bearings 2 is supplied from pump 9 through a discharge conduit 12, having suitable branches 12a, 12b. The discharge conduit 12 also supplies fluid to other branches 12c, 12d having suitable nozzles for discharging a stream of oil onto the meshing gear teeth of the pinions 6, 7, respectively.

Pump discharge conduit 12 also supplies liquid to a branch 12e containing the automatic regulating valve 11. This branch is arranged to deliver an additional increment of oil for cooling the gear teeth mesh, by way of spray nozzles in the branches 13, 14.

The automatic valve 11 comprises a housing 15 having at one end a valve chamber containing a well-known type of balanced valve disk assembly 16. The other end of housing 15 defines a pressure signal chamber 17 containing a diaphragm 18 arranged to positioned the valve spindle 19. A suitable spring 20 biases diaphragm 18 against the force of liquid admitted to the chamber 17 through a conduit 21 communicating with branch line 12e.

The general operation of the system is that at low speeds the control valve 11 is in closed position and oil is supplied through the branch lines 12a, 12b, 12c, and 12d to supply the minimum lubricating requirements of the bearings 2 and the comparatively small amount of oil required to lubricate the gear mesh at low speeds. When a certain pre-selected speed is reached, above which the loads on the gear teeth necessitate an increased amount of oil for cooling the teeth, the regulating valve opens and admits oil to the gear mesh through conduit 12e and the branches 13, 14.

To state the operation another way, the single pump 9 has a capacity at full speed to satisfy the total lubrication and cooling requirements of the bearings and gears at full rated load and speed. Then, as the speed falls, the pump discharge pressure drops, with the result that, if the invention were not used, in the low-speed range not enough oil would be supplied for the bearing lubrication requirements. Therefore, with the arrangement of the invention, the closing of the valve 11 increases the fraction which the effective area of the passage conducting oil to the bearings bears to the total passage area supplying both the bearing and mesh requirements. Thus, adequate lubricant for the bearings is provided at low speeds.

In designing an improved system incorporating our invention, it will, of course, be a simple matter to select a pump having definitely known speed-pressure characteristics. Then, taking into consideration the known characteristics of the pump, the supply conduits 12a, 12b, are designed so that in the low speed range an adequate supply of oil will be furnished to meet the minimum lubrication requirements of the bearings 2 and the lubrication requirements of the gear teeth. These lubrication requirements will be sufficiently high to furnish the oil required to carry away the comparatively small amount of heat generated. However, as the speed and power transmitted increase, the cooling requirements of the bearings and gears increase much more rapidly than the lubrication requirements. Therefore, there comes a time when, without the extra supply line 12e with the automatic valve 11, the system, as described above, would provide either too much oil to the bearings, resulting in increased power losses, or else too little fluid for carrying away the heat generated in the meshing gear teeth. The design of the automatic valve 11 is such that, when this critical point in the operation is attained, the pressure of the liquid in conduit 12e, communicated to the pressure sensitive diaphragm 18 causes the valve disk assembly 16 to move, effecting supply of liquid through conduit 12e to the branches 13, 14, so as to supply additional cooling liquid to the gear mesh.

In other words, the function of this divided liquid supply system with the automatic valve 11 is to provide a certain total effective orifice area for supplying lubricant to the bearings and gears at low speeds, while giving an automatically increased effective orifice area for supplying coolant to the gear teeth at higher speeds and loads. Thus, in the low speed range, an adequate supply of lubricant is furnished to the bearings and gear teeth while in the higher speed range an increased portion of the total liquid available from the pump is supplied to the gear teeth to carry away the heat generated.

While the specific design of the various components must be determined from a consideration of all the circumstances in a particular application, it may be noted generally that a single, simple, positive displacement pump selected so as to furnish adequate cooling and lubricating liquid at full-rated speed would satisfactorily lubricate and cool the gears down to a speed as low as perhaps 40% of the full rated speed. However, below this speed the oil supplied to the bearings would become inadequate. With the invention, the single pump is enabled to supply the lubricating and cooling requirements of both gear teeth and bearings down to a speed of the order of 20% of the full rated speed. Of course, the complex requirements of apparatus like this could be effectively met by two or more pumps with an automatic control device for cutting one in and out. However, with the invention a single pump is enabled to do work for which two or more pumps would otherwise be required. Furthermore, the single pump in a system incorporating the invention is of much smaller size than would be required if a single pump were required to do the job without use of the invention. This means that the size, weight, spaced required, and cost of the pump 9 is greatly reduced, size and weight being of particular importance in a naval vessel where space is at a premium and every unnecessary pound reduces the pay load. Also, it may be noted that the power required by the single pump in a system incorporating the invention is only about half that required if the invention is not employed. Another important advantage lies in the fact that with the invention a smaller quantity of oil is required, so that the weight of the oil and the size of the tank may be reduced. Another substantial advantage is that at low speeds the quantity of oil supplied to the gear teeth is reduced, as compared with that which would be supplied without the invention, which means that the energy consumed by friction and shearing within the oil film between the teeth is reduced.

More specifically, it may be noted that in a representative system incorporating the invention, oil may be supplied to the bearings and gear teeth at the rate of about 30 gallons per minute when the pump is operating at about 3 lbs. per square inch discharge pressure, being the minimum permissible operating conditions for continuous operation, corresponding to a speed of perhaps 70 R. P. M. of the low-speed output shaft 5. Now if the speed and load increase, the valve 11 may be arranged to open at a pump pressure of about 5 lbs. per square inch, corresponding to 45 gallons per minute delivery to the conduits 12a, 12b, 12c, 12d. The opening of the automatic valve has the effect of increasing the aggregate area of the nozzles supplying oil to the gear mesh so that the aggregate orifice area of the nozzles delivering oil to the gears becomes a larger fraction of the total orifice area of both bearing and gear supply nozzles. With the valve 11 open, the total delivery of pump 9 may increase to about 160 gallons per minute at a pressure of 15 pounds per square inch, corresponding to full rated speed of 350 R. P. M. of the low speed shaft 5.

As described above, the arrangement of Fig. 1 is particularly convenient since the single pump 9, of very cheap and simple construction, serves both to provide the liquid for cooling and lubricating the bearings and gear teeth, and also produces a pressure signal proportional to speed for actuating the automatic valve 11. It will be appreciated, however, that many other speed or load responsive devices might be used to actuate the auxiliary supply valve 11. In Fig. 2 is shown a speed-responsive valve including a fly-ball governor 22 driven by suitable gearing 23 from shaft 5 and arranged to position an oil flow control valve member 24 having a housing 25. The governor may have a lost motion connection consisting of a rod 22a with an enlarged head adapted to engage a yoke 22b after the rod 22a has moved a pre-selected amount. As in the modification of Fig. 1, the automatic valve 25 is located in the conduit 12e supplying the branch conduits 13, 14. With this arrangement the automatic valve is directly responsive to shaft speed, whereas in Fig. 1, the valve 11 is directly responsive to pump discharge pressure but indirectly responsive to shaft speed. It will be readily apparent to those skilled in the art that these are actually equivalent systems.

It will be also apparent that many other modifications of the invention may be made. For instance, instead of having only a single branch conduit 12e with an automatic valve 11, several branches corresponding to the branch 12e might be provided, each supplying auxiliary nozzles delivering oil to the gear tooth mesh. These several valves would be designed to open sequentially as the speed and load increase so that the supply of cooling oil to the gears would increase according to a predetermined schedule. The arrangement of such a system is believed to be obvious and, therefore, is not shown in the drawings.

It will be seen that the invention provides a comparatively cheap and simple arrangement for supplying the complex lubrication and cooling requirements of large marine propulsion gearing and similar equipment.

It will be apparent that many other modifications and changes may be made, and it is desired to cover by the appended claims all such modifications as fall within the true spirit and scope of the invention.

What we claim as new and desire to secure by Letters Patent of the United States is:

1. In a liquid supply system for cooling and lubricating a gear unit having means for delivering liquid to the bearings and meshing gear teeth from a pump, the combination of distribution conduits including first conduit means supplying liquid from the pump to the bearings and meshing gear teeth, second conduit means supplying liquid from the pump to the gear mesh only, and automatic valve means for effecting flow through the second conduit only at speeds above a pre-selected value, whereby the fraction of the total flow which is supplied to the meshing gear teeth is increased above said pre-selected speed.

2. In a liquid supply system for cooling and lubricating a gear unit having orifice means for delivering liquid to the bearings and meshing gear teeth from a pump, the combination of distribution conduits including first conduit means supplying liquid from the pump to both the bearings and meshing gear teeth, second conduit means supplying additional liquid from the pump to the meshing gears only, valve means in the second conduit, and means responsive to the rotational speed of the gears for opening said valve at speeds above a pre-selected value, whereby a greater proportion of the total liquid flow is delivered to the meshing gear teeth in the high load portion of the range of operation.

3. In a liquid supply system for cooling and lubricating a gear unit having orifice means for delivering liquid to the bearings and meshing gear teeth from a positive displacement pump having a discharge pressure bearing a substantially straight-line relation to rotational speed, the combination of distribution conduits including first conduit means supplying liquid from the pump to both the bearings and meshing gear teeth, second conduit means supplying liquid from the pump to the gear mesh only, valve means in the second conduit, and means responsive to the discharge pressure of the pump for opening said valve at pressures above that corresponding to a pre-selected rotational speed of the gears, whereby a greater fraction of the total liquid flow is delivered to the meshing gear teeth in the high speed range of operation.

4. A liquid distribution system in accordance with claim 2 in which the speed responsive means is a centrifugal flyball governor driven at a fixed speed ratio from the gear unit and having valve means adapted to effect flow through the second liquid distribution conduit at speeds above a pre-selected value.

NORMAN A. SMITH.
FRANCIS O. FRIDELL.

REFERENCES CITED

The following references are of record in the file of this patent:

UNITED STATES PATENTS

| Number | Name | Date |
|---|---|---|
| 908,529 | Williams | Jan. 5, 1909 |
| 1,749,077 | Kennedy | Mar. 4, 1930 |

FOREIGN PATENTS

| Number | Country | Date |
|---|---|---|
| 86,618 | Switzerland | Oct. 1, 1920 |